United States Patent [19]

Robota et al.

[11] 3,800,028

[45] Mar. 26, 1974

[54] FORMATION OF HIGHLY REACTIVE FORM OF PHOSPHORUS PENTASULFIDE

[75] Inventors: Stephen Robota, North Tonawanda; Vernon J. Lloyd, Lewiston, both of N.Y.

[73] Assignee: Hooker Chemical Corporation, Niagara Falls, N.Y.

[22] Filed: Nov. 12, 1971

[21] Appl. No.: 198,411

[52] U.S. Cl. ............................................... 423/303
[51] Int. Cl. .......................................... C01b 25/14
[58] Field of Search ....................... 423/303; 23/206

[56] References Cited
UNITED STATES PATENTS
3,205,041    9/1965    Cremer et al. ...................... 423/303
FOREIGN PATENTS OR APPLICATIONS
1,024,308    3/1966    Great Britain ....................... 23/206

OTHER PUBLICATIONS

Smith, "Introduction to Inorganic Chemistry", p. 562–563 (192).

Primary Examiner—Edward J. Meros
Assistant Examiner—Gregory A. Heller
Attorney, Agent, or Firm—Peter F. Casella; Richard P. Mueller; Monroe D. Edelman

[57]         ABSTRACT

The preparation of highly reactive phosphorus pentasulfide is described. The process involves forming a mixture of an inert gas and vapors of phosphorus pentasulfide and cooling the resultant mixture to condense therefrom phosphorus pentasulfide in a highly reactive form.

7 Claims, No Drawings

FORMATION OF HIGHLY REACTIVE FORM OF PHOSPHORUS PENTASULFIDE

SUBJECT MATTER OF THE INVENTION

This invention relates to a process for the preparation of highly reactive phosphorus pentasulfide.

Phosphorus pentasulfide ($P_4S_{10}$) is manufactured commercially by reacting phosphorus and sulfur in approximately stoichiometric proportions. The crude product may be distilled and the liquid $P_4S_{10}$ poured into molds, drums, or other containers or cast in a thin film on a cold surface for solidification. Inasmuch as the rate of cooling in the first instance is noncontrollable, the product obtained is of variable reactivity. $P_4S_{10}$ on the outer periphery has a different rate of reactivity than the product in the inner portion of the container. In the second case, because of the more rapid cooling rate the resultant $P_4S_{10}$ is comparably more reactive.

U.S. Pat. No. 3,023,086 discloses a process for controlling the reactivity of $P_4S_{10}$ by adjusting the cooling rate of molten $P_4S_{10}$ through the phase transition range of 260° to 280° centigrade. Thus $P_4S_{10}$ is prepared, distilled, and cooled at a controlled rate through the aforementioned transition temperature range. This process while effective requires, on commercial scale, the controlled cooling of the molten $P_4S_{10}$ in relatively thin sheets and subsequent pulverization of product produced.

Phosphorus pentasulfide products of lesser reactivity than that produced by the aforementioned process can, as disclosed in U.S. Pat. No. 3,146,069, be prepared by annealing the $P_4S_{10}$ after initial cooling. Such annealed products are acceptable for use in applications wherein a more highly reactive form of $P_4S_{10}$ may not be required.

OBJECTS OF THE INVENTION

It is a principal object of the present invention to devise a process for the preparation of phosphorus pentasulfide in a form which is more highly reactive than that obtained by prior art procedures.

Another object is to devise a process for the preparation of phosphorus pentasulfide in highly reactive forms directly from crude material.

Other objects will be apparent from the following description of the invention.

BRIEF DESCRIPTION OF THE INVENTION

The process of the present invention broadly comprises the steps of forming a mixture of a heated inert gas and vapors of phosphorus pentasulfide and directing the resultant mixture of inert gas and vapors of phosphorus pentasulfide into an area wherein the phosphorus pentasulfide is rapidly cooled and condensed in highly reactive form.

The process of the invention can be carried out in a continuous or batchwise manner.

The inert gas used in this process can be any gaseous substance which does not react with the phosphorus pentasulfide under the conditions of this process. As typical examples of such inert gases nitrogen, carbon dioxide, fluoro-carbons such as trichloromonofluoromethane, helium, neon and argon are mentioned. Nitrogen because of its general availability and low cost is preferred.

DETAILED DESCRIPTION OF THE INVENTION

In accordance with a preferred mode of carrying out this invention, a body of phosphorus pentasulfide, which may be in a crude or distilled form, is charged to a suitable vessel wherein the material is melted by heating to and maintained at about 425° to about 500° centigrade. A stream of inert gas, preferably nitrogen, which had been preheated to about 350° to 500° centigrade is introduced into the vapors of $P_4S_{10}$ at a point above or remote from the level of the molten phosphorus pentasulfide. The mixture of gas and vapors of phosphorus pentasulfide entrained in the gas is directed into a tower wherein the vapors are rapidly cooled to below their solidification point and thusly condensed to a powder which drops to the bottom of the tower and can be periodically discharged therefrom. Preferably, the hot gaseous mixture is contacted with a stream of the same or other inert gas which is preferably at below about 100° centigrade and especially at below about 25° centigrade, introduced into the tower at the upper portion thereof, to assist in the condensation of the vapors of $P_4S_{10}$. The inert gas is exited from the tower preferably through a means for removing entrained particles of phosphorus pentasulfide which may be a baffle, scrubber, filter, cyclone, condenser or the like, and the inert gas is preferably directed back through the preheater to the vessel containing the molten phosphorus pentasulfide. Any residual $P_4S_{10}$ would thus be returned to the process avoiding air pollution or product loss.

The process can be carried out at atmospheric or sub-atmospheric pressure, for example between about 200 and 300 mm Hg absolute pressure. The mixture of inert gas and vapors of $P_4S_{10}$ can be formed in any convenient manner. Thus the inert gas can be directed over molten $P_4S_{10}$ or sparged into the molten $P_4S_{10}$ or the $P_4S_{10}$ may be distilled in vacuo and the resultant vapors admixed with the inert gas, prior to entry of the vapors into the tower.

The cooling of the mixture or inert gas and vapors of $P_4S_{10}$ is accomplished in a tower, condenser, "barn" or analogous equipment. The tower may be cooled externally or internally to expedite the heat transfer, and the tower may contain deflectors or other appurtanances to distribute the gas stream, filters to remove solid particles of $P_4S_{10}$ from the gas stream, scrapers to remove condensed particles of $P_4S_{10}$ from the walls of the tower or condenser, and the like.

The reactivity of the phosphorus pentasulfide can be determined by a modification of the procedure disclosed in U.S. Pat. No. 3,023,086, Example 1. Because of the hyperreactivity of the product of this invention, an alcohol of lesser reactivity than ethanol is used. In this instance n-hexanol is used. The test procedure is as follows:

One hundred eleven grams of phosphorus pentasulfide are charged to a dry stoppered Dewar flask, equipped with stirrer, vent, thermometer, and dropping funnel. To the $P_4S_{10}$, at ambient temperature, 186 grams of cool (45° Fahrenheit) n-hexanol are rapidly added, and the mixture is agitated at 420 rpm. The temperature is recorded at 1 minute intervals until a marked decrease in the rate of temperature rise is noted. The temperature is thereafter recorded at 2–3 minute intervals until a peak temperature is noted. The profile of the temperature versus time is plotted and the form of the curve compared with a similar curve obtained using flaked $P_4S_{10}$, ground to a particle size of 100 percent passing through a 20 mesh screen prepared according to U.S. Pat. No. 3,023,086, as a control.

The following examples illustrate the process of the present invention. Parts and percentages are by weight and temperatures are given in degrees centigrade unless otherwise indicated.

EXAMPLE I

A stream of nitrogen, flowing at the rate of 3.36 parts/minute was preheated to 451° and introduced into a vessel containing 695 parts of distilled phosphorus pentasulfide (P content 27.99 percent) heated to and maintained at 494°. The nitrogen was passed over the surface of the molten $P_4S_{10}$, and the mixture of nitrogen and entrained vapors of $P_4S_{10}$ were directed into a tower wherein they were cooled rapidly to condense the $P_4S_{10}$ as a fine powder which collected, mostly, at the bottom of the tower. The nitrogen gas passed upwardly through the tower through a filter, to remove solid particles, and out the top of the tower, through a second filter into a scrubber, to remove residual $P_4S_{10}$. The scrubbed nitrogen was vented to the atmosphere.

A total of 380 parts of yellow $P_4S_{10}$ (P content of 28.33 percent) was recovered from the original charge. The reactivity of this material, as measured by its reaction exotherm with n-hexanol is shown in Table I below, compared to a control run using flaked $P_4S_{10}$.

TABLE I

| Time (minutes) | Product of Example 1 °F. | Control °F. |
| --- | --- | --- |
| 1 | 139 | 66 |
| 2 | 148 | 74 |
| 5 | 166 | 108 |
| 10 | 182 | 144 |
| 20 | 190 | 171 |
| 30 | 188 | 184 |

EXAMPLE 2

Nitrogen, preheated to 402°, was passed at the rate of 3.36 parts per minute over 700 parts of distilled $P_4S_{10}$ (P content of 27.99 percent) maintained at 471°. The mixture of nitrogen gas and entrained vapors of $P_4S_{10}$ were directed to the tower as in Example 1 above, and the run was concluded after 250 parts of $P_4S_{10}$ (P content of 28.19 percent) were collected as a fine powder at the bottom of the tower.

The reactivity of the resultant product is shown in TABLE II below.

TABLE II

| TIME (minutes) | Temperature °F Product of Example II | Temperature °F Control (same as in Ex. 1.) |
| --- | --- | --- |
| 1 | 173 | 66 |
| 2 | 181 | 74 |
| 5 | 194 | 108 |
| 10 | 201 | 144 |
| 20 | 200 | 171 |
| 30 | 198 | 184 |

EXAMPLE 3

In this run, 700 parts of distilled $P_4S_{10}$ (P content of 27.99 percent) were heated to and maintained at 438°. The system was evacuated to an absolute pressure of 242 mm of mercury. Nitrogen at 16.5° was admitted to the top of the tower, flowing at the rate of 8.26 parts per minute and a second stream of nitrogen preheated to about 450° and flowing at the rate of 4.54 parts per minute was bled into the vapor line connecting the vessel containing the molten $P_4S_{10}$ and the tower. Thus vapors of $P_4S_{10}$ emanated from the vessel and were admixed with nitrogen gas in the vapor line connecting the vessel and the tower. The gaseous mixture was contacted in the tower with the cold primary stream of nitrogen which assisted in condensing the $P_4S_{10}$ from the mixture. After the collection of 157.7 parts of $P_4S_{10}$ as a bright yellow fine powder, the run was concluded.

The reactivity of this product is shown in Table III below:

TABLE III

| TIME (minutes) | Temperature °F Product of Example III |
| --- | --- |
| 1 | 185 |
| 2 | 198 |
| 5 | 216 |
| 10 | 224 |
| 20 | 223 |
| 30 | 220 |

What is claimed is:

1. A process for the preparation of highly reactive phosphorus pentasulfide which comprises:
   a. forming a mixture of an inert gas preheated to about 350° to 500° centigrade and vapors of phosphorus pentasulfide from a body of molten phosphorus pentasulfide maintained at about 425° to about 500° centigrade,
   b. rapidly cooling and condensing said vapors to form highly reactive phosphorus pentasulfide powder from said mixture, and
   c. separating said highly reactive phosphorus pentasulfide powder.

2. The process of claim 1 in which the inert gas is selected from the group consisting of nitrogen, carbon dioxide, trichloromonofluoromethane, helium, neon and argon.

3. The process of claim 2 in which the inert gas is nitrogen.

4. The process of claim 1 wherein the mixture of inert gas and vapors of phosphorus pentasulfide is formed by passing a stream of heated inert gas over a molten body of phosphorus pentasulfide.

5. The process of claim 1 in which
   a. the vapors of phosphorus pentasulfide emanate from a body of molten phosphorus pentasulfide maintained under a reduced pressure of from about 200 to about 300 mm Hg absolute pressure,
   b. said mixture of inert gas and vapors of phosphorus pentasulfide is formed by introducing the heated inert gas into the vapors of phosphorus pentasulfide at a point remote from the molten pentasulfide but before the point at which the said vapors are condensed, and
   c. the vapors of phosphorus pentasulfide are rapidly cooled and condensed in part to a highly reactive particulate solid by contacting the said mixture with a second stream of inert gas.

6. The process of claim 5 in which the heated inert gas is nitrogen.

7. The process of claim 1 wherein the mixture of inert gas and vapors of phosphorus pentasulfide is formed by sparging said inert gas into said molten phosphorus pentasulfide.

\* \* \* \* \*